UNITED STATES PATENT OFFICE.

ERASTUS FAIRBANKS AND THADDEUS FAIRBANKS, OF ST. JOHNSBURY, VERMONT.

IMPROVEMENT IN THE MODE OF CONSTRUCTING AND WEIGHING BY MEANS OF THE STEELYARD-BALANCE

For which Letters Patent were granted, dated September 22, 1832, which Letters Patent are hereby canceled on account of a defective specification.

Specification forming part of Letters Patent No. 121, dated February 10, 1837.

*To all whom it may concern:*

Be it known that we, ERASTUS FAIRBANKS and THADDEUS FAIRBANKS, both of St. Johnsbury, in the county of Caledonia and State of Vermont, have invented a new and Improved Mode of Weighing by Means of the Steelyard-Balance; and we do hereby declare that the following is a full and exact description of our said improvement.

The main object had in view by us was to adapt the balance more perfectly than has heretofore been done to those machines which are constructed for the purpose of weighing loaded wagons and other articles of great weight; but our improved balance is also applicable to such ordinary weighing as is effected by means of instruments constructed on the principles of what is called "Dearborn's patent balance," when the same is used for ponderous articles. We construct a balance in the general form above indicated; but to the extreme end of it we give that shape which is usually given to the points of suspension in a scale-beam. This is done for the purpose of hanging thereto a pendulous rod having a flange at its lower end or other contrivance to support weights, to be presently described.

The arm of the balance is divided, and has a movable poise and hook in the usual way, and when used should first be brought into equilibrium with poise hanging in the first notch, which should be marked 0.

Weights bearing a given ratio to each other are prepared to be placed upon the flanged rod at the end of the arm. These are usually formed with a slit or gain from one side to the center to adapt it more perfectly to the rod.

We will now suppose the balance with its poise to weigh any number of pounds from one to one hundred, or from one to one thousand. The weights to be placed upon the rod may indicate 100, 200, 500, 1,000, 5,000, or any even number of hundreds or thousands of pounds, while the movable poise will point out the number of pounds intermediate between any of the hundreds or thousands.

What we claim, and for which we ask a patent, is—

The combination of the use of the graduated weights, as above described, to be suspended at the end of the beam, indicating the hundreds and thousands of pounds, with a movable poise traversing the arm of the beam and showing the intermediate pounds.

ERASTUS FAIRBANKS.
   THADDEUS FAIRBANKS.

Witnesses:
 LUTHER JEWETT,
 HIRAM KNAPP.